United States Patent [19]
Ohata et al.

[11] 3,710,089
[45] Jan. 9, 1973

[54] HIGHLY PRECISE AND STABLE LOGARITHMIC CIRCUIT

[75] Inventors: Shuichi Ohata; Yoji Takeuchi; Takeshi Ishiguro, all of Tokyo, Japan

[73] Assignee: Yokogawa Electric Words Ltd., Tokyo

[22] Filed: Dec. 20, 1971

[21] Appl. No.: 209,651

[30] Foreign Application Priority Data

Dec. 29, 1970   Japan ............................. 45/128618

[52] U.S. Cl. .............. 235/193, 235/151.35, 328/145
[51] Int. Cl. .............................................. G06g 7/24
[58] Field of Search ................. 235/193, 183, 197, 235/151.3, 151.35, 194, 195, 196; 328/145, 160, 161; 307/229

[56]  References Cited

UNITED STATES PATENTS

| | | | |
|---|---|---|---|
| 3,245,304 | 4/1966 | Davis | 235/151.35 UX |
| 3,428,796 | 2/1969 | Martens et al. | 235/151.35 X |
| 3,484,596 | 12/1969 | Vince | 235/151.35 X |
| 3,553,444 | 1/1971 | Tong | 235/151.35 |
| 3,600,567 | 8/1971 | Varnela | 235/151.35 X |

Primary Examiner—Joseph F. Ruggiero
Attorney—Roland T. Bryan et al.

[57]  ABSTRACT

A logarithmic circuit of a highly precise and stable type useful in absorption metering apparatus where the range of input signals is narrow. The circuit receives an input signal which has the form of a product of an input reference signal and an exponential signal. The circuit, by means of a feedback operational amplifier, provides a difference signal proportional to the difference between the input signal and the input reference signal. The difference signal thereby includes its own reference signal component corresponding proportionally to said input reference signal. By means of a resistive voltage divider circuit, the difference signal is split into first portion equal to a constant $a$ times the difference signal and a second portion equal to $(1-a)$ times the difference signal, and $a$ is selected to be approximately $1/\sqrt{2}$. The first portion is added to the corresponding reference signal component to form a sum signal by which another signal, equal to the square of the corresponding reference signal component, is divided to produce a quotient signal. The second portion is added to the corresponding reference signal component to provide a second sum signal which is in turn subtracted in a subtracting circuit from the quotient signal. The resulting output signal is linearly related to the logarithm of the input signal to within approximately 0.1 percent.

9 Claims, 2 Drawing Figures

HIGHLY PRECISE AND STABLE LOGARITHMIC CIRCUIT

BACKGROUND OF THE INVENTION

1. Field of the Invention

This invention relates to circuits which function to derive the logarithm of an input signal and, more particularly, to such circuits employed in a measuring apparatus, such as a petroleum sulfur concentration meter, where highly precise and stable measurement is required of input signals within a relatively narrow range. This type of measuring apparatus includes a detector with a signal in which the measured quantity appears in an exponential term, necessitating a logarithmic circuit in order to present the measured quantity in linear form for application to standard meters and the like. For accurate measurement, the output of the logarithmic circuit must be linearly approximate very closely the logarithm of the input signal.

2. Description of the Prior Art

Conventional logarithmic circuits include feedback type amplifiers which utilize the non-linear characteristics of diodes and transistors in order to provide a logarithmic signal. Such logarithmic circuits, although operative over wide ranges of input signals, have insufficient precision and stability to achieve accurate measurement of signals lying within a narrow range of variation.

SUMMARY OF THE INVENTION

Objects of the present invention are to provide a logarithmic circuit which is highly precise and stable within a narrow range of input signals, which is relatively simple and economical in construction, which achieves its precision without using the characteristics of diodes and transistors, and which is consequently more commercially adaptable for utilization in accurate measuring apparatus.

The logarithmic circuit according to the invention precisely derives the logarithm of an input signal which takes the form of a product of an input reference signal and an exponential signal. The circuit comprises means for providing a difference signal proportional to the difference between the input signal and its input reference signal, said difference signal thereby including a reference signal component of its own corresponding proportionally to said input reference signal. The difference signal is applied to means which provide a first portion thereof equal to a constant $a$ times the difference signal and a second portion thereof equal to ($1 - a$) times the difference signal, where $a$ is selected to be approximately $1/\sqrt{2}$. The first portion of the difference signal is added to the corresponding reference signal component and their sum is used to divide a signal equal to the square of the corresponding reference signal component, thereby yielding a quotient signal. The second portion of the difference signal is added to the corresponding reference signal component and their sum is subtracted from the quotient signal to provide an output signal which linearly approximates the logarithm of the input signal with great precision and stability, the approximation being within about 0.1 percent.

In further aspects of the invention, the difference signal is provided by a feedback operational amplifier, the first and second portions of the difference signal are provided by a resistive voltage divider means, the quotient signal is provided by a dividing circuit, and the subtraction from the quotient signal of the second summed signal takes place in a subtraction circuit. In a circuit particularly adapted for measurement purposes in a radiant absorption concentration meter, the output signal is applied to another subtraction circuit which subtracts a constant voltage therefrom, the difference being applied to a division circuit which divides it by a signal related to density of the material being measured, the resulting quotient being a linear function of concentration.

Other objects, aspects and advantages of the invention will be pointed out in, or be apparent from, the detailed description hereinbelow, considered together with the following drawings.

DESCRIPTION OF THE PREFERRED EMBODIMENTS

Figure 1:
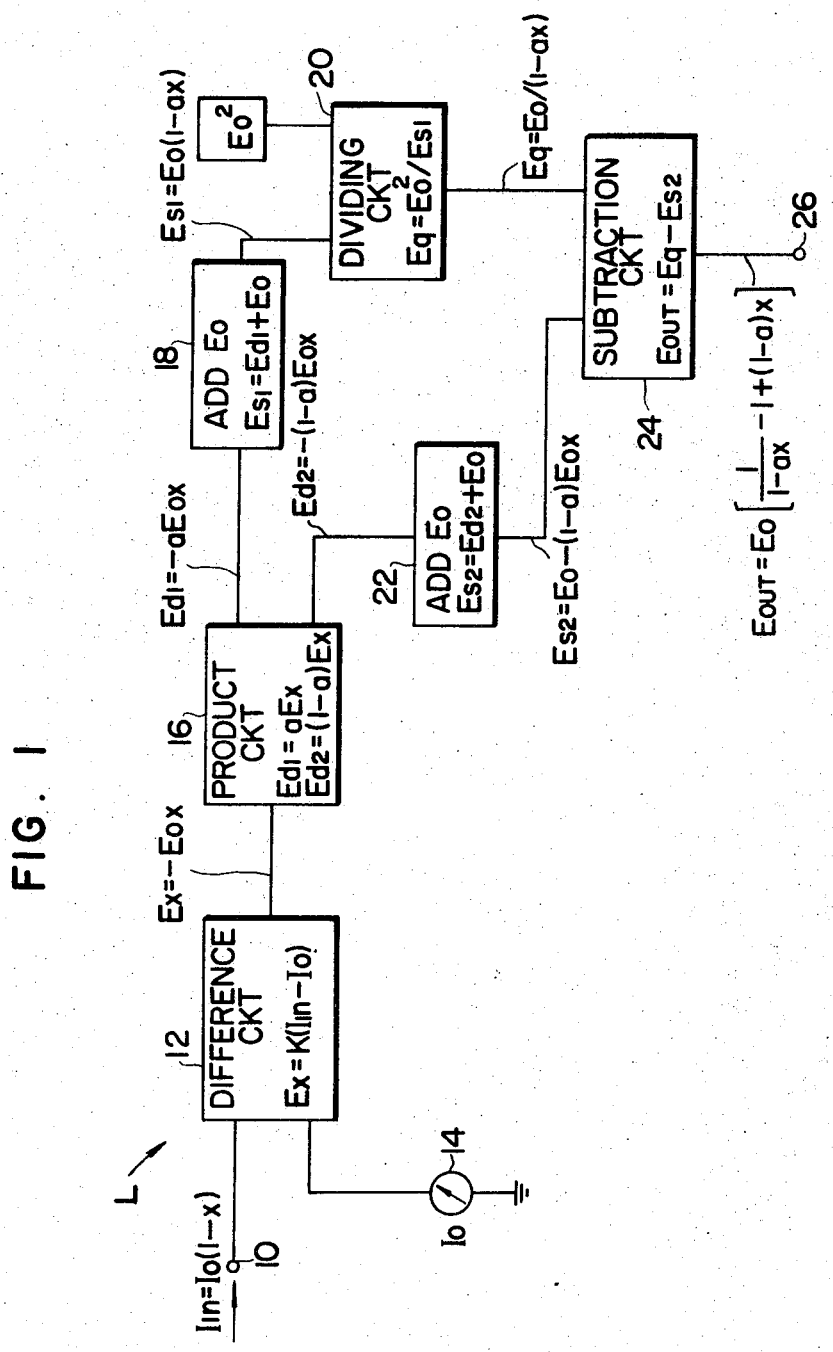
FIG. 1 is a block diagram illustrating signal operations taking place in the logarithmic circuit of the present invention.

FIG. 1 illustrates, in block form, a logarithmic circuit L arranged according to the invention, having an input terminal 10 receiving an input current Iin from, for example, the detector portion of a measuring apparatus. The input current Iin has the following form:

$$Iin = Io\, e^{-y} \quad (2)$$

where $Io$ is an input reference signal current (a constant), $e$ is the natural logarithmic base, and the exponent $y$ is the variable whose value is of interest. For convenience in the following circuit analysis, we let $$x = 1 - e^{-y} \quad (2)$$

and therefore $$Iin = Io\,(1 - x) \quad (3)$$

The input current $Iin$ is applied to a difference circuit 12 which also receives reference current signal $Io$ from a current source 14, and furnishes an output voltage $Ex$ proportional to the difference between the two input currents, given as $$Ex = -Eo\, x \quad (4)$$

where $Eo$ is a reference signal voltage component which is proportional to the input reference signal current $Io$.

The difference voltage $Ex$ is applied to a product circuit 16 which separates the difference voltage $Ex$ into two output voltage portions $Ed1$ and $Ed2$ which are multiples of the difference voltage $Ex$ by the constants $a$ and ($1-a$) respectively, where $a$ is selected to be approximately $1/\sqrt{2}$. Accordingly, $$Ed1 = -a\, Eo\, x \quad (5)$$

and $$Ed2 = -(1-a)Eo\, x \qquad (6)$$

The first voltage portion $Ed1$ and the reference voltage component $Eo$ are added together in an adder 18 to produce a first sum voltage $Es1$ given by $$Es1 = Eo(1-ax) \qquad (7)$$

The first sum voltage $Es1$ is applied as one input of a dividing circuit 20, the other input of which is a voltage equal to the square of the reference voltage signal $Eo$. The dividing circuit 20 divides the $Eo^2$ signal by the first sum signal $Es1$ to produce at its output a quotient signal $Eq$ given by $$Eq = Eo/(1-ax) \qquad (8)$$

The second voltage portion $Ed2$ is applied to another adder 22 which adds the reference voltage signal $Eo$ to produce a second sum signal $Es2$ given by $$Es2 = Eo - (1-a)Eo\, x \qquad (9)$$

The second sum signal $Es2$ is subtracted from the quotient signal $Eq$ in a subtraction circuit 24 whose output, at output terminal 26, is a voltage $E$ out given by $$E\text{ out} = Eo\left[\frac{1}{1-ax} - 1 + (1-a)x\right] \qquad (10)$$

$E$ out is an accurate linear approximation of the logarithm of the input signal $Iin$, as shown by the following analysis. Expanding equation 10 as an infinite series, the following expression results:

$$E\text{ out} = Eo[x + (ax)^2 + (ax)^3 + \ldots] \qquad (11)$$

where $ax$ is less than 1. Substituting the constant $a = 1/\sqrt{2}$ in this equation gives $$E\text{ out} = Eo\left[x + \frac{x^2}{2} + \frac{x^3}{(\sqrt{2})^3} + \frac{x^4}{4} \cdots\right] \qquad (12)$$

or $$E\text{ out} = Eo\left[x + \frac{x^2}{2} + \frac{x^3}{2.83} + \frac{x^4}{4} + \frac{x^5}{5.66} + \cdots\right] \qquad (13)$$

The progression series in equation 13 closely approximates the progression series of expansion $-\log(1-x)$, which is $$-\log(1-x) = x + \frac{x^2}{2} + \frac{x^3}{3} + \frac{x^4}{4} + \frac{x^5}{5} + \cdots \qquad (14)$$

To illustrate the closeness of the approximation, Table 1 below lists, for selected values of $x$, the sum of the first five terms of the series in equations 13 and 14 and the percentage which the difference bears to the value given by equation 14. That is, in Table 1, $$D\% = 100\%\,[-\log(1-x) - E\text{ out}]/-\log(1-x) \qquad (15)$$

TABLE 1

| $x$ | $-\log(1-x)$ | $E$ out | $D\%$ |
|---|---|---|---|
| 0 | 0 | 0 | 0 |
| 0.1 | 0.10536 | 0.10538 | −0.020 |
| 0.2 | 0.22314 | 0.22329 | −0.069 |
| 0.3 | 0.35676 | 0.35711 | −0.098 |
| 0.4 | 0.51083 | 0.51149 | −0.129 |
| 0.5 | 0.69315 | 0.69299 | +0.023 |

Table 1 shows that $E$ out closely approximates a logarithmic function within a tolerance of about 0.1 percent, and hence the following relationship is highly accurate:

$$E\text{ out} = -Eo\log(1-x) = Eo\, y \qquad (16)$$

The approximation of equation 16 is highly accurate even though the constant $a$ deviates somewhat from $1/\sqrt{2}$ and hence it is apparent that any value of $a$ approximately equal to $1/\sqrt{2}$ is sufficient.

Figure 2:
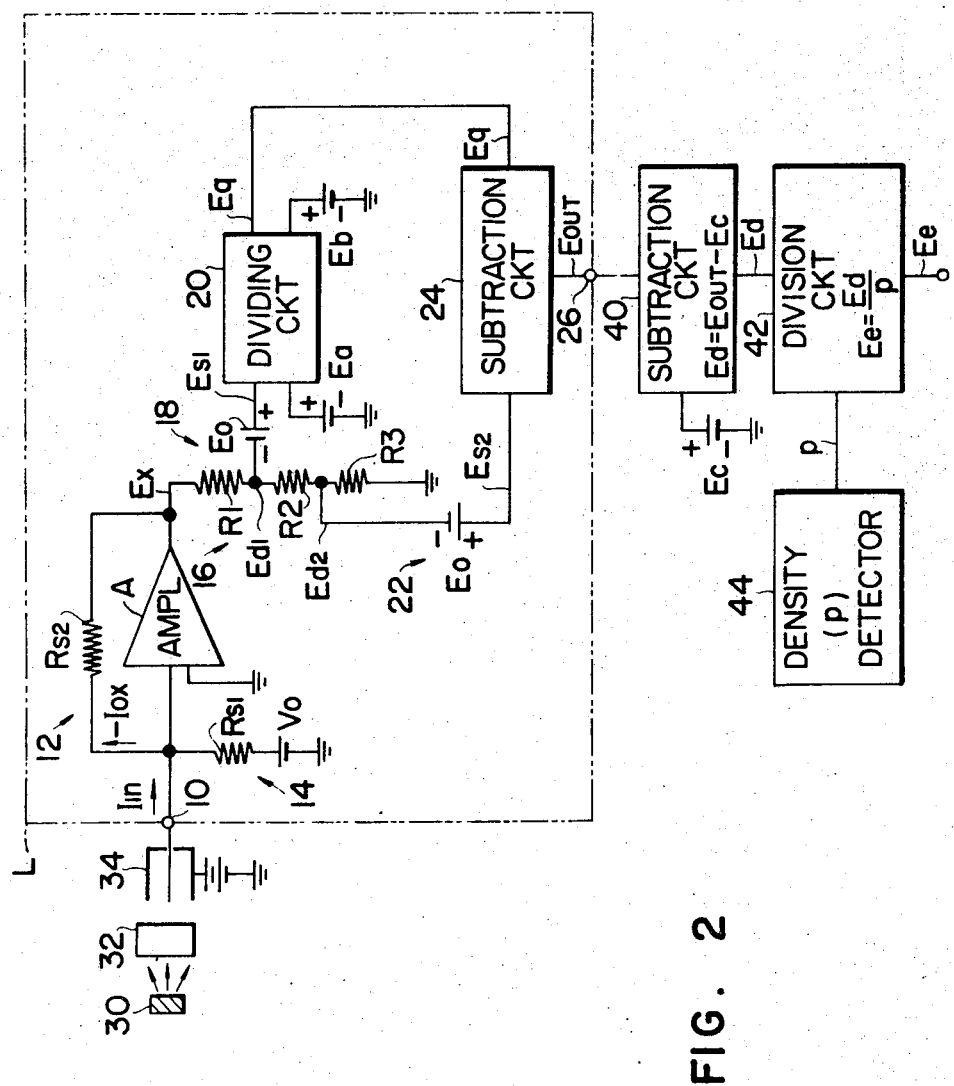
FIG. 2 is a schematic diagram, partly in block form, illustrating an embodiment of the invention as applied to a measuring system operating as a concentration meter.

FIG. 2 illustrates further details of the logarithmic circuit L, together with additional circuit components coupled to the logarithmic circuit L to form a concentration measurement apparatus, the particular apparatus selected for this illustrative example being a petroleum sulfur concentration meter. In this apparatus, a source 30 sends radiant rays into a sample cell 32 of the material being measured. A detector 34 having an ionizing chamber produces a current signal $Iin$ of the form shown in Equation 1, where $Io$ is the output of detector 34 when the measurement cell is empty and where $y$ is given by $$y = -pt[(mS - mCH)Cs + mCH] \qquad (17)$$

where $p$ is the density of the sample, $t$ is the effective length of the measurement cell, $Cs$ is the sulfur concentration (the unknown to be measured), $mS$ is the mass absorption coefficient of sulfur, and $mCH$ is the mass absorption coefficient of hydrocarbons.

The input current $Iin$ is applied to input terminal 10 of logarithmic circuit L. In logarithmic circuit L, the current source 14 is provided by a voltage source $Vo$ in series with a resistor $RS1$, and difference circuit 12 comprises a feedback operational amplifier A with feedback resistor $RS2$. At the output of amplifier A there appears voltage $Ex$ as described previously, the reference voltage component $Eo$ thereof being $Io\, RS2$.

Product circuit 16 comprises a resistive voltage divider including series resistors $R1$, $R2$, and $R3$ across which the voltage $Ex$ is impressed. The first voltage portion $Ed1$ is taken at the junction of resistors $R1$ and $R2$, and the second portion voltage $Ed2$ is taken at the junction of resistors $R2$ and $R3$. The resistors $R1$, $R2$, and $R3$ are related such that $$R1 = R3 \qquad (18)$$

$$R2 = (2a - 1/1 - a)R1 \qquad (19)$$

As a result of these relationships, the voltages $Ed1$ and $Ed2$ are as given by equations 5 and 6 above.

The circuits 18 and 22 adding the voltage $Eo$ to the voltages $Ed1$ and $Ed2$ are shown in FIG. 2 as series voltage sources of voltage $Eo$. Division circuit 20 is illustrated as being of the four terminal type wherein $$Eq = (Ea\, Eb/Es1) \qquad (20)$$

The voltages $Ea$ and $Eb$ are given individual voltage values such that $$Ea\, Eb = Eo^2 \qquad (21)$$

Subtraction circuit 24 then provides at output terminal 26 a voltage $E$ out which is given by equation 16 above.

A specific numerical example of the application of the principles described above to a petroleum sulfur concentration meter will now be described.

With a reference density ($po = 0.78$ g/cm$^3$) and a reference concentration ($Cs = Cso$), the detection output $Io1$ is, from equations 1 and 17:

$$Io1 = Io\, e^{-0.78t[(mS - mCH)Cso + mCH]} \qquad (22)$$

Rearranging equation 1 by using equations 16 and 22, $$lin = Io\mathbf{1}\ e^{-\mathbf{1}pt\{(mS-mCH)Cs+mCH\}-0.78t\{(mS-mCH)Cso+mCH\}\mathbf{1}} \quad (23)$$

Substituting $mS - mCH = a$ and $mCH = b$ in equation 22, $$lin = Iol\ e^{-\{pt(aCS + b) - 0.78t(a\,CSo + b)\}} \quad (24)$$

Accordingly, an input signal corresponding to equation 24, processed by the logarithmic amplifier L of the present invention, becomes a voltage E out at output terminal 26:

$$E\ out = -Eo\ \log\ (1-x) = Eo\cdot\{pt\ (a\ CS+b)-0.78t\ (a\ CSo+b)\} \quad (25)$$

As shown in FIG. 2, the signal E out of equation 25 is subtractively combined in a subtracting circuit 40 with a constant voltage $Ec = Eo \cdot \{-0.78t\ (a\ CSo = b)\}$, and the resultant voltage Ed is divided in a division circuit 42 by the petroleum density detection signal $p$, derived from a density detector 44, thereby eliminating the density term p to obtain a linear expression $Ee = Eot\ (aCs + b)$ for the sulfur concentration $Cs$.

An example of the precision obtained with the sulfur concentration meter of the above construction is given by the following calculation:

With $t = 3.2$ cm, $mS = 3.252$ cm$^2$/g, $mCH = 0.2243$ cm$^2$/g, $Cso = 0$, $po = 0.78$ g/cm$^3$, $Cs = 0.03$ and detected petroleum density $p = 0.98$ g/cm$^3$, substitution in equation 24 gives $1 - e^{-y} = x = 0.36205$. From Table 1, the linearity error for this value of $x$, that is, the error from the ideal logarithmic conversion output, is about 0.1 percent. If the range of the sulfur concentration is 3 percent, a linearity error of this order results in an error of about 0.0015 percent in the determination of the sulfur concentration, which is a very small error in this type of measuring method.

While a typical example of the invention has been described in relation to a petroleum sulfur concentration meter utilizing the absorption of radiant rays, the invention is by no means limited to this specific example, but is broadly applicable to logarithmic conversion where the input range is comparatively narrow.

Although specific embodiments of the invention have been disclosed herein in detail it is to be understood that this is for the purpose of illustrating the invention, and should not be construed as necessarily limiting the scope of the invention, since it is apparent that many changes can be made to the disclosed structures by those skilled in the art to suit particular applications. For example, while the logarithmic circuit L accepts a signal in a current mode and converts it to a voltage mode for various operations, it is clear that the current mode could be used throughout or that an input signal in the voltage mode could be accommodated.

We claim:

1. A circuit for accurately deriving the logarithm of an input signal which has the form of a product of an input reference signal and an exponential signal, comprising
    means for providing a difference signal proportional to the difference between said input signal and said input reference signal, said difference signal thereby including its own reference signal component corresponding to said input reference signal;
    means for providing a first portion of said difference signal equal to a constant $a$ times the difference signal and a second portion of said difference signal equal to $(1 - a)$ times the difference signal, where the constant $a$ is approximately $1/\sqrt{2}$;
    means for providing a quotient signal which is equal to the square of the corresponding reference signal divided by the sum of said first portion and said corresponding reference signal; and
    means for subtracting from said quotient signal the sum of said second portion and said corresponding reference signal to provide an output signal which linearly approximates the logarithm of said input signal.

2. A logarithmic circuit as claimed in claim 1 wherein said means for providing a difference signal comprises feedback amplifier means receiving at an input terminal thereof said input signal, means for supplying a signal equal to said input reference signal to said input terminal, the feedback amplifier means being arranged to subtract the input reference signal from the input signal and to provide at its output said difference signal.

3. A logarithmic circuit as claimed in claim 1 wherein said means providing said first and second portions of said difference signal comprises resistive voltage divider means formed of series-connected resistors.

4. A logarithmic circuit as claimed in claim 3 wherein said resistive voltage divider means comprises three resistors in series valued to provide at one junction a ratio of $a: 1$ and at the other junction a ratio of $(1 - a) : 1$.

5. A logarithmic circuit as claimed in claim 1 wherein said means providing a quotient signal comprises means for adding a signal equal to said corresponding reference signal to said first portion to produce said sum signal, and a divider circuit having as inputs thereto said sum signal and a pair of signals whose product is the square of the corresponding reference signal, said divider circuit being arranged to provide at an output a signal which is the quotient of the squared reference signal divided by the sum signal.

6. A logarithmic circuit as claimed in claim 1 wherein said subtracting means comprises means for adding a signal equal to said corresponding signal to said second portion to provide said sum signal, and subtraction circuit means having said sum signal at one input and said quotient signal at another input and having an output equal to the difference therebetween.

7. In a measurement apparatus comprising a detector supplying, over a narrow range, an input signal having the form of a product of an input reference signal and an exponential signal whose exponent is of interest, the improvement which comprises a circuit for accurately deriving over said narrow range the logarithm of said input signal, said circuit comprising:
    amplifier means for providing a difference signal proportional to the difference between said input signal and said input reference signal, said difference signal thereby including a reference signal component corresponding to said input reference signal;
    voltage divider means for providing a first portion of said difference signal equal to a constant $a$ times the difference signal and a second portion equal to $(1 - a)$ times the difference signal, where the constant $a$ is approximately $1/\sqrt{2}$;

division circuit means for providing a quotient signal which is equal to the square of the corresponding reference signal divided by the sum of said first portion and said corresponding reference signal; and subtraction circuit means for subtracting from said quotient signal the sum of said second portion and said corresponding reference signal to provide an output signal which linearly approximates the logarithm of said input signal.

8. A measurement apparatus as claimed in claim 7 wherein said input signal is from an absorption measurement arrangement, and wherein said measurement apparatus further comprises means for subtracting a constant signal from said output signal, and means for dividing the resultant signal.

9. A method for accurately deriving the logarithm of an input signal which has the form of a product of an input reference signal and an exponential signal comprising providing a difference signal proportional to the difference between said input signal and said input reference signal, said difference signal thereby including a reference signal component corresponding to said input reference signal;

multiplying said difference signal by a constant $a$ to provide a first portion thereof, the constant $a$ being approximately $1/\sqrt{2}$;

multiplying said difference signal by $(1 - a)$ to provide a second portion thereof;

adding said first portion to said corresponding reference signal to provide a first sum signal;

dividing the square of the corresponding reference signal by said first sum signal to provide a quotient signal;

adding said second portion to said corresponding reference signal to provide a second sum signal;

subtracting said second sum signal from said quotient signal to provide an output signal which linearly approximates the logarithm of said input signal.

* * * * *